United States Patent
Park et al.

(10) Patent No.: US 12,506,200 B2
(45) Date of Patent: Dec. 23, 2025

(54) METHOD OF MANUFACTURING BATTERY MODULE CAPABLE OF PREVENTING CHAIN IGNITION

(71) Applicant: LG ENERGY SOLUTION, LTD., Seoul (KR)

(72) Inventors: Sung Kyu Park, Daejeon (KR); Young Bum Cho, Daejeon (KR); Hae Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 678 days.

(21) Appl. No.: 17/907,901

(22) PCT Filed: Jun. 11, 2021

(86) PCT No.: PCT/KR2021/007308
§ 371 (c)(1),
(2) Date: Aug. 29, 2022

(87) PCT Pub. No.: WO2022/005042
PCT Pub. Date: Jan. 6, 2022

(65) Prior Publication Data
US 2023/0138854 A1    May 4, 2023

(30) Foreign Application Priority Data

Jun. 29, 2020 (KR) .................. 10-2020-0079310

(51) Int. Cl.
*H01M 50/143*   (2021.01)
*H01M 50/209*   (2021.01)
(Continued)

(52) U.S. Cl.
CPC ....... *H01M 50/143* (2021.01); *H01M 50/209* (2021.01); *H01M 50/293* (2021.01);
(Continued)

(58) Field of Classification Search
CPC ......... H01M 10/6557; H01M 10/6555; H01M 50/289; H01M 50/293; H01M 10/653; H01M 10/658; H01M 10/0481
See application file for complete search history.

(56) References Cited

U.S. PATENT DOCUMENTS

| 9,236,585 B2 | 1/2016 | Nishikawa et al. |
| 10,665,912 B2 | 5/2020 | Jennrich et al. |

(Continued)

FOREIGN PATENT DOCUMENTS

| CN | 103563124 A | 2/2014 |
| CN | 106486623 A | 3/2017 |

(Continued)

OTHER PUBLICATIONS

Knowledge Center, "Polyurethane Temperature Range", <https://knowledgecenter.mearthane.com/polyurethanetemperaturerange>, accessed May 7, 2025 (Year: 2025).*

(Continued)

*Primary Examiner* — Jessie Walls-Murray
(74) *Attorney, Agent, or Firm* — Morgan, Lewis & Bockius LLP (57) ABSTRACT

A method of manufacturing a battery module may prevent chain ignition. The method may include preparing a module case having a plurality of receiving portions formed therein, each of the receiving portions having a space of a predetermined size; disposing a respective battery cell among a plurality battery cells in each of the receiving portions; and heating the module case with the battery cells to a predetermined temperature to fix the battery cells in the respective receiving portions of the module case. The module case comprises a lower plate, a plurality of side plates, and a plurality of partition walls configured to form the receiving portions, and each of the partition walls comprises a lower partition wall extending from the lower plate by a predeter- (Continued)

mined height and an upper partition wall extending from the lower partition wall by a predetermined height.

11 Claims, 6 Drawing Sheets

(51) Int. Cl.
  *H01M 50/242* (2021.01)
  *H01M 50/293* (2021.01)
  *H01M 50/414* (2021.01)
  *H01M 50/46* (2021.01)

(52) U.S. Cl.
  CPC ....... *H01M 50/414* (2021.01); *H01M 50/461* (2021.01); *H01M 50/242* (2021.01)

(56) References Cited

U.S. PATENT DOCUMENTS

| | | | |
|---|---|---|---|
| 2003/0193315 A1 | 10/2003 | Madjar et al. | |
| 2010/0266880 A1* | 10/2010 | Hirakawa | H01M 50/213 429/53 |
| 2013/0244089 A1 | 9/2013 | Shimizu et al. | |
| 2013/0344376 A1 | 12/2013 | Asaida et al. | |
| 2014/0045037 A1 | 2/2014 | Nishikawa et al. | |
| 2014/0370363 A1 | 12/2014 | Oshiba et al. | |
| 2015/0092360 A1 | 4/2015 | Stillman et al. | |
| 2017/0062782 A1 | 3/2017 | Cho et al. | |
| 2017/0077468 A1* | 3/2017 | Gerundt | H01M 10/6568 |
| 2017/0301905 A1 | 10/2017 | Takeda et al. | |
| 2018/0123101 A1* | 5/2018 | Maguire | H01M 50/24 |
| 2018/0205048 A1 | 7/2018 | Enomoto et al. | |
| 2018/0223070 A1 | 8/2018 | O'Neil et al. | |
| 2018/0269438 A1 | 9/2018 | Nishikawa et al. | |
| 2018/0358592 A1 | 12/2018 | Park et al. | |
| 2019/0267584 A1 | 8/2019 | Kwon et al. | |
| 2019/0280260 A1 | 9/2019 | Shimizu | |
| 2020/0058972 A1 | 2/2020 | Kawai et al. | |
| 2020/0062920 A1 | 2/2020 | O'Neil et al. | |
| 2020/0144573 A1 | 5/2020 | Park et al. | |
| 2020/0343495 A1 | 10/2020 | Kritzer et al. | |
| 2022/0081529 A1 | 3/2022 | O'Neil et al. | |
| 2023/0068533 A1* | 3/2023 | Hirano | H01M 50/296 |
| 2023/0387538 A1* | 11/2023 | Kim | H01M 50/242 |

FOREIGN PATENT DOCUMENTS

| | | | |
|---|---|---|---|
| CN | 110462875 A | | 11/2019 |
| DE | 10 2012 018 036 A1 | | 3/2014 |
| JP | 2013-191440 A | | 9/2013 |
| JP | 2015-002082 A | | 1/2015 |
| JP | 2017-068986 A | | 4/2017 |
| JP | 2019-508871 A | | 3/2019 |
| JP | 2019-053816 A | | 4/2019 |
| JP | 2019-091628 A | | 6/2019 |
| JP | 6673606 B2 | | 3/2020 |
| KR | 10-2005-0000384 A | | 1/2005 |
| KR | 10-2016-0065177 A | | 6/2016 |
| KR | 10-2019-0093991 A | | 8/2019 |
| KR | 10-2019-0125988 A | | 11/2019 |
| KR | 10-2019-0132631 A | | 11/2019 |
| WO | 2012/124273 A1 | | 9/2012 |
| WO | 2012/164923 A1 | | 12/2012 |
| WO | 2017/056742 A1 | | 4/2017 |
| WO | 2017-125985 A1 | | 7/2017 |
| WO | 2018-037860 A1 | | 3/2018 |
| WO | 2019/042698 A1 | | 3/2019 |

OTHER PUBLICATIONS

International Search Report (with partial translation) and Written Opinion dated Sep. 28, 2021 issued in corresponding International Patent Application No. PCT/KR2021/007308.
Office Action issued Sep. 29, 2023 for counterpart Chinese Patent Application No. 202180016248.5.
Office Action issued Oct. 2, 2023 for counterpart Japanese Patent Application No. 2022-549358.
"Adhesive solutions for efficient Li-ion cell assembly", Mar. 2, 2020, Henkel AG, p. 1-4, XP 093055065.
Extended European Search Report issued Feb. 6, 2024 for European Patent Application No. 21833326.8.
Partial Supplementary European Search Report dated Jul. 6, 2023, issued in corresponding European Patent Application No. 21833326.8.

* cited by examiner

METHOD OF MANUFACTURING BATTERY MODULE CAPABLE OF PREVENTING CHAIN IGNITION

TECHNICAL FIELD

This application claims the benefit of priority to Korean Patent Application No. 2020-0079310 filed on Jun. 29, 2020, the disclosure of which is incorporated herein by reference in its entirety.

The present invention relates to a method of manufacturing a battery module capable of preventing chain ignition, and more particularly to a method of manufacturing a battery module capable of preventing chain ignition configured such that heat transfer to adjacent battery cells is inhibited and the weight of the battery module is reduced.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

In the battery module or the battery pack, a plurality of battery cells is connected to each other in series or in parallel in order to increase capacity and output of the battery module or the battery pack. In the case in which a plurality of battery cells is used in a state of being connected to each other, a problem, such as overload, may occur.

In order to solve this problem, a battery module including a module case capable of inhibiting transfer of heat generated in a specific battery cell to another battery cell adjacent thereto has been developed.

Figure 1:
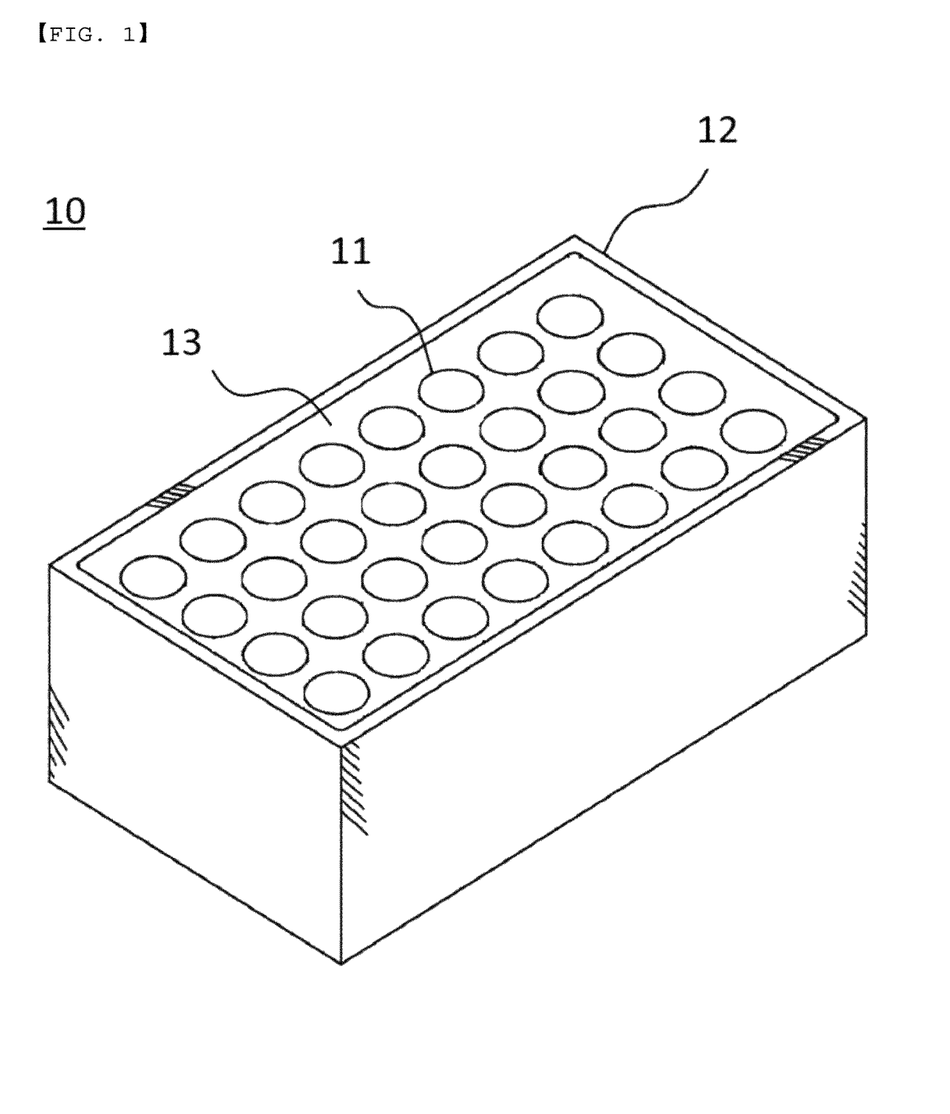
FIG. 1 is a perspective view showing a conventional battery module.

FIG. 1 is a perspective view showing a conventional battery module. As shown in FIG. 1, the conventional battery module 10 includes a plurality of battery cells 11, a module case 12 configured to receive the plurality of battery cells 11 therein, and a filler 13 configured to wrap the plurality of battery cells 11 and to fill spaces among the battery cells 11.

In the conventional battery module, the filler 13 is formed among the battery cells 11 received in the module case 12, whereby the battery cells 11 are disposed spaced apart from each other by a predetermined distance. Consequently, there is an effect that it is possible to inhibit movement of heat generated in a specific battery cell 11 to another battery cell 11 adjacent thereto, whereby it is possible to improve safety of the battery module.

Since the battery cells 11 are disposed adjacent to each other, however, filling using the filler 13 is not easy. Furthermore, in the case in which an empty space is generated, it is not possible to sufficiently inhibit heat transfer, and the battery cells are not securely fixed, whereby the battery cells 11 may move even due to weak external impact, which may lead to a major accident.

PRIOR ART DOCUMENT (Patent Document 1) Korean Patent Application Publication No. 2019-0132631

DISCLOSURE

Technical Problem

The present invention has been made in view of the above problems, and it is an object of the present invention to provide a method of manufacturing a battery module capable of preventing chain ignition configured such that movement of heat generated in any one of a plurality of battery cells received in the battery module to another battery cell adjacent thereto is inhibited and that the battery cells are securely fixed.

It is another object of the present invention to provide a method of manufacturing a battery module capable of preventing chain ignition such that energy density of the battery module is high while the weight of the battery module is reduced.

It is a further object of the present invention to provide a method of manufacturing a battery module capable of preventing chain ignition such that manufacturing time is reduced and a product defect rate is reduced.

Technical Solution

A method of manufacturing a battery module capable of preventing chain ignition according to the present invention to accomplish the above objects includes a step of preparing a module case (110) having a plurality of receiving portions (114) formed therein, each of the receiving portions having a space of a predetermined size; a step of receiving a battery cell (130) in each of the receiving portions (114); and a step of performing heating to a predetermined temperature to fix the battery cell (130), wherein the module case (110) includes a lower plate (111), a plurality of side plates (112), and a plurality of partition walls (113) configured to form the receiving portions (114), and each of the partition walls (113) includes a lower partition wall (113(a)) extending from the lower plate (111) by a predetermined height and an upper partition wall (113(b)) extending from the lower partition wall (113(a)) by a predetermined height.

Also, in the battery module manufacturing method according to the present invention, the lower partition wall (113(a)) and the upper partition wall (113(b)) may be made of different materials.

Also, in the battery module manufacturing method according to the present invention, each of the lower plate (111), the side plate (112), and the lower partition wall (113(a)) of the module case (110) may be made of a thermoplastic resin, and the upper partition wall (113(b)) may be made of a thermosetting resin.

Also, in the battery module manufacturing method according to the present invention, the thermoplastic resin may be modified polyphenylene ether (mPPE) or polycarbonate (PC), and the thermosetting resin may be at least one of silicon, epoxy, and polyurethane.

Also, in the battery module manufacturing method according to the present invention, the upper partition wall (113(b)) may further include glass bubbles.

Also, in the battery module manufacturing method according to the present invention, the module case (110) may be formed by injection molding.

Also, the battery module manufacturing method according to the present invention may further include a step of injecting an adhesive member (120) into the receiving portions (114) between the step of preparing the module case (110) having the plurality of receiving portions (114) formed therein, each of the receiving portions having the space of the predetermined size, and the step of receiving the battery cell (130) in each of the receiving portions (114).

Also, in the battery module manufacturing method according to the present invention, the adhesive member (120) may be a thermosetting resin.

Also, in the battery module manufacturing method according to the present invention, the battery cell (130) may be cylindrical or prismatic.

In addition, the present invention provides a battery pack having received therein a battery module (100) manufactured through the manufacturing method having one or more of the features mentioned above.

In addition, the present invention provides a device having the above battery pack mounted therein.

Advantageous Effects

As is apparent from the above description, a method of manufacturing a battery module capable of preventing chain ignition has a merit in that battery cell receiving portions are formed in a module case in advance, an adhesive member is injected into the receiving portions, and battery cells are received and fixed in the receiving portions, whereby it is possible to greatly reduce manufacturing time.

In addition, the method of manufacturing the battery module capable of preventing chain ignition has an advantage in that the thermosetting adhesive member injected into the receiving portions in advance uniformly wraps the outer surfaces of the battery cells in a battery cell receiving process, whereby it is possible to securely fix the battery cells, and therefore impact resistance of the battery module is high.

Furthermore, the method of manufacturing the battery module capable of preventing chain ignition has an advantage in that glass bubbles are included in a partition wall configured to partition the battery cells from each other, whereby it is possible to reduce the weight of the battery module, and a thermosetting resin, which is relatively expensive, is less used, whereby it is possible to reduce manufacturing cost.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a method of manufacturing a battery module capable of preventing chain ignition according to the present invention will be described with reference to the accompanying drawings.

Figure 2:
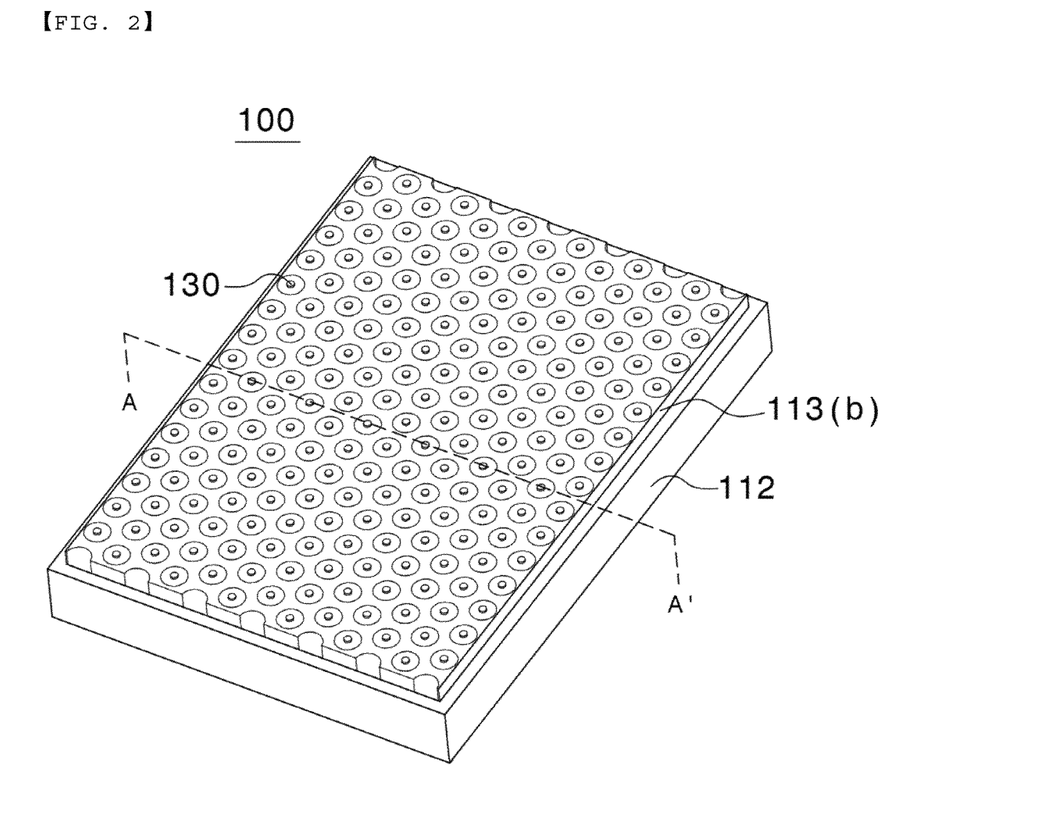
FIG. 2 is a perspective view of a battery module according to a preferred embodiment of the present invention.
Figure 3:
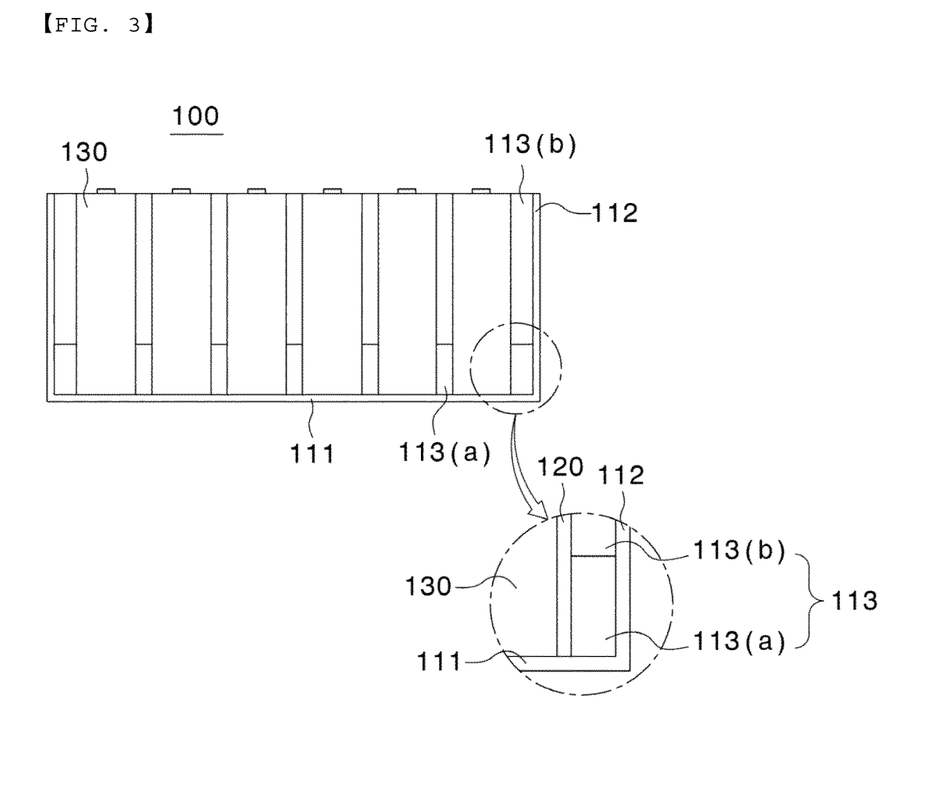
FIG. 3 is a sectional view taken along line A-A' of FIG. 2.

FIG. 2 is a perspective view of a battery module according to a preferred embodiment of the present invention, and FIG. 3 is a sectional view taken along line A-A' of FIG. 2.

Referring to FIGS. 2 and 3, the battery module 100 according to the present invention includes a module case 110, an adhesive member 120, and a plurality of battery cells 130 received in the module case 110.

First, the module case 110, which has an approximately hexahedral external shape, includes a flat lower plate 111 and four side plates 112 extending upwards perpendicularly from the edge of the lower plate 111 so as to provide a space in which the plurality of battery cells 130 is received in a state of being spaced apart from each other by a predetermined distance.

Here, each of the lower plate 111 and the four side plates 112 may be made of a thermoplastic resin that exhibits predetermined strength in order to protect the received battery cells 130 from external impact, such as modified polyphenylene ether (mPPE) or polycarbonate (PC). However, the material for each plate is not particularly restricted as long as the plate is capable of achieving the same purpose and function.

In addition, a partition wall 113 is provided in the space defined by the lower plate 111 and the side plates 112 in order to form a plurality of receiving portions in which the battery cells 130 are separately received. The partition wall 113 may include a lower partition wall 113(a) extending from the lower plate 111 by a predetermined height and an upper partition wall 113(b) extending from the lower partition wall 113(a) by a predetermined height.

Here, it is preferable for the lower partition wall 113(a) to be made of the same material as the lower plate 111, i.e. a thermoplastic resin, such as modified polyphenylene ether (mPPE) or polycarbonate (PC), whereas it is preferable for the upper partition wall 113(b) to be made of a thermosetting resin that exhibits low thermal conductivity and high heat resistance, e.g. at least one of silicon, epoxy, and polyurethane.

Consequently, a portion of the lower side of each received battery cell 130 may be supported by the lower partition wall 113(*a*), which exhibits high stiffness, and heat transfer from the battery cell to another battery cell adjacent thereto may be minimized by the upper partition wall 113(*b*). Of course, it is obvious that the battery cell 130 may also be fixed and supported by the upper partition wall 113(*b*).

Meanwhile, empty glass bubbles each having a predetermined size may be further included in the upper partition wall 113(*b*). That is, in the case in which a thermosetting resin, such as silicon, epoxy, or polyurethane, is mixed with glass bubbles to form the upper partition wall 113(*b*), it is possible to reduce weight of the module case 110, and the thermosetting resin, which is relatively expensive, is less used, whereby it is possible to reduce manufacturing cost.

In addition, an adhesive member 120, e.g. an adhesive member 120 made of the same material as the upper partition wall 113(*b*), i.e. a thermosetting resin, may be further provided between the outer surface of the battery cell 130 and the partition wall 113.

Although the adhesive member 120 is shown as being interposed only between the partition wall 113 and the side surface of the battery cell 130 in FIG. 3, it is obvious that the adhesive member may also be formed between the lower plate 111 and the bottom surface of the battery cell 130.

Although not particularly restricted, the thickness of the partition wall 113 or the sum of the thickness of the partition wall 113 and the thickness of the adhesive member 120 may be 2 mm or less, preferably 1 mm or less, in order to increase energy density of the battery module.

Figure 4:
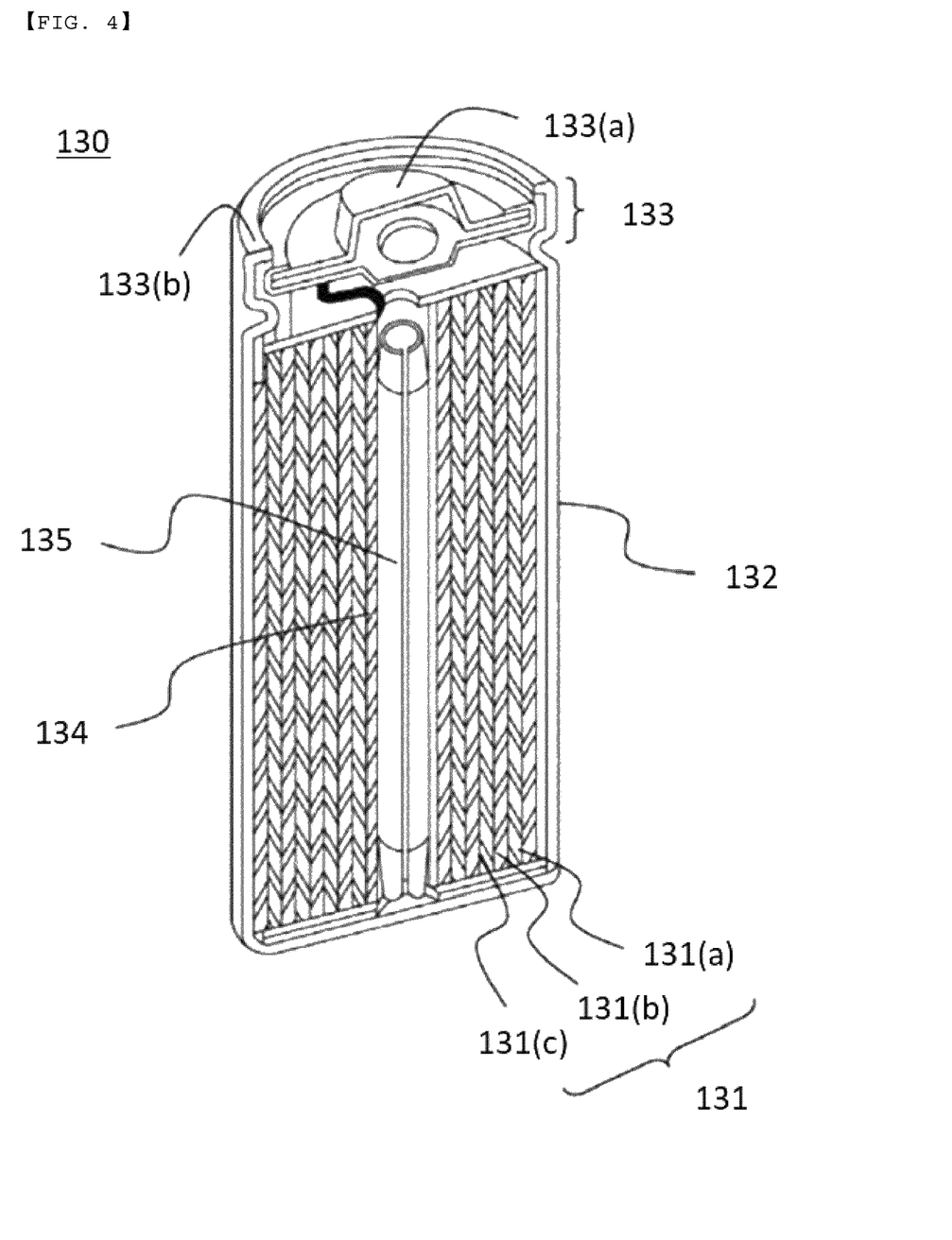
FIG. 4 is a sectional view of a battery cell according to a preferred embodiment of the present invention.

FIG. 4 is a sectional view of a battery cell according to a preferred embodiment of the present invention. The battery cell received in the module case according to the present invention is not restricted to the cylindrical battery cell shown in FIG. 4, and may be a prismatic battery cell.

When describing the cylindrical battery cell shown in FIG. 4 by way of example, the battery cell 130 may be manufactured by receiving a wound type electrode assembly 131 in a metal can 132, injecting an electrolytic solution into the metal can 132, and coupling a cap assembly 133 having an electrode terminal formed thereon to the open upper end of the metal can 132.

Here, the electrode assembly 131 is manufactured by sequentially stacking a positive electrode 131(*a*), a negative electrode 131(*b*), and a separator 131(*c*) and winding the same so as to have a round shape.

A cylindrical center pin 135 is inserted into a hollow core portion 134 formed at a central region of the electrode assembly 131. The center pin 135 is generally made of a metal material so as to have predetermined strength. The center pin 135 serves to fix and support the electrode assembly 131, and also serves as a passage configured to discharge gas generated as a result of internal reaction when the battery cell is charged and discharged and when the battery cell is operated.

Meanwhile, a positive electrode terminal 133(*a*) is formed on a central region of the upper end of the cap assembly 133 in a protruding state, and the remaining region of the metal can 132 forms a negative electrode terminal 133(*b*).

Of course, a battery cell usable as a secondary battery is not limited to a cylindrical battery cell 130 having the above construction.

Figure 5:
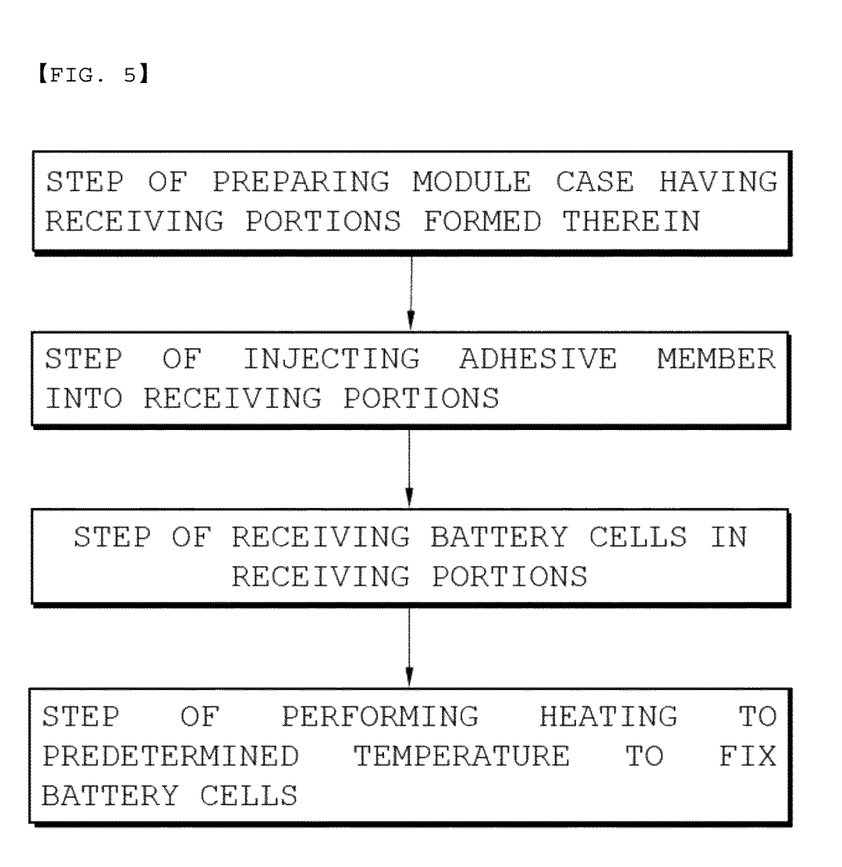
FIG. 5 is a flowchart illustrating a battery module manufacturing method according to a preferred embodiment of the present invention.
Figure 6:
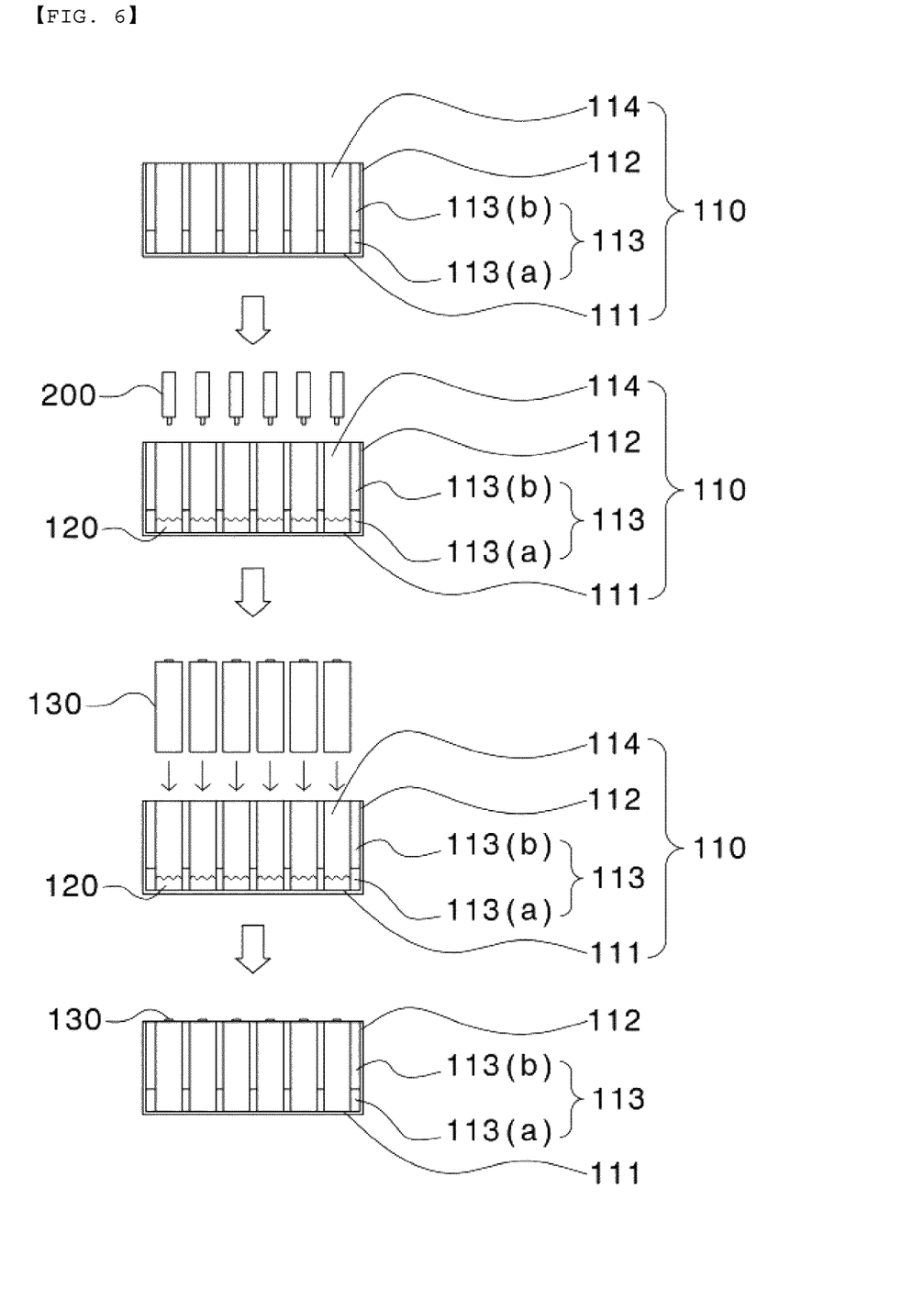
FIG. 6 is a conceptual view illustrating the battery module manufacturing method according to the preferred embodiment of the present invention.

FIG. 5 is a flowchart illustrating a battery module manufacturing method according to a preferred embodiment of the present invention, and FIG. 6 is a conceptual view illustrating the battery module manufacturing method according to the preferred embodiment of the present invention.

Referring to FIGS. 5 and 6, the battery module manufacturing method according to the preferred embodiment of the present invention includes a step (S1) of preparing a module case having a plurality of receiving portions formed therein, a step (S2) of injecting an adhesive member into the plurality of receiving portions, a step (S3) of receiving a battery cell in each of the receiving portions, and a step (S4) of performing heating to a predetermined temperature to fix the battery cell.

First, the step (S1) of preparing the module case having the plurality of receiving portions formed therein is a step of preparing a module case 110 having the above construction, i.e. a module case 110 having a space defined by a lower plate 111 and four side plates 112, wherein receiving portions 114 are formed in the space by partition walls 113, each of which includes a lower partition wall 113(*a*) and an upper partition wall 113(*b*).

Here, it is obvious that the inner diameter of each of the receiving portions 114 must be slightly greater than the outer diameter of a cylindrical battery cell received therein, and glass bubbles are preferably mixed in the upper partition wall 113(*b*).

Meanwhile, it is preferable for the module case 110 to be manufactured as one body by injection molding. As an example, over-molding, multiple injection, or blocking injection molding may be used. However, the molding method is not particularly restricted as long as it is possible to integrate dissimilar materials. In the case in which the above molding method is adopted, there are advantages in that it is possible to form a partition wall 113 having a small thickness and the thickness of the partition wall 113 is uniform.

The step (S2) of injecting the adhesive member into the plurality of receiving portions is a step of injecting a predetermined amount of an adhesive member 120 made of a thermosetting material, such as silicon, epoxy, or polyurethane, through an injection portion 200.

The adhesive member 120 fills a gap between a battery cell 130 to be received and the partition wall 113 in order to securely fix the battery cell 130 and to prevent heat transfer to another battery cell 130 adjacent thereto.

In the step (S3) of receiving the battery cell in each of the receiving portions, the battery cell 130 is seated in the receiving portion 114 in the state in which the receiving portion 114 is filled with the predetermined amount of the adhesive member 120. At this time, the adhesive member 120 is pushed upwards to the space between the partition wall 113 and the battery cell 130, whereby the adhesive member has a shape surrounding the outer circumferential surface of the battery cell 130.

The step (S4) of performing heating to a predetermined temperature to fix the battery cell, which is the last step, is a step of heating the adhesive member 120 to a predetermined temperature at which a thermosetting resin can be hardened for a predetermined time to fix the battery cell 130 to the partition wall 113.

Conventionally, a plurality of battery cells is received in a module case, a thermosetting resin is injected into a space between the battery cells, and the thermosetting resin is hardened, whereby a battery module is manufactured. However, it is not easily to inject the thermosetting resin into a small gap between the battery cells, whereby product defects are incurred and manufacturing time is increased.

In the present invention, by contrast, a module case having battery cell receiving portions formed therein is prepared, an adhesive member is injected into the receiving portions, and battery cells are received and hardened, whereby it is possible to very easily form a partition wall that partitions the battery cells.

The present invention may provide a battery pack having received therein a battery module manufactured by the battery module manufacturing method having at least one of the features described above.

In addition, the present invention may provide a device having the battery pack mounted therein. The device may be an electronic device including a large-capacity battery, such as an electric vehicle, a hybrid electric vehicle, or a plug-in hybrid electric vehicle.

Those skilled in the art to which the present invention pertains will appreciate that various applications and modifications are possible within the category of the present invention based on the above description.

DESCRIPTION OF REFERENCE SYMBOLS

100: Battery module
110: Module case
111: Lower plate 112: Side plate
113: Partition wall
113(a): Lower partition wall 113(b): Upper partition wall
114: Receiving portion
120: Adhesive member
130: Battery cell
131: Electrode assembly
131(a): Positive electrode 131(b): Negative electrode
131(c): Separator
132: Metal can
133: Cap assembly
133(a): Positive electrode terminal 133(b): Negative electrode terminal
134: Core portion
135: Center pin
200: Injection portion

The invention claimed is:

1. A method of manufacturing a battery module capable of preventing chain ignition, the method comprising:
preparing a module case of one body having a plurality of receiving portions formed therein, each of the receiving portions having a space of a predetermined size;
disposing a respective battery cell among a plurality battery cells in each of the receiving portions; and
heating the module case with the battery cells to a predetermined temperature to fix the battery cells in the respective receiving portions of the module case,
wherein the module case comprises a lower plate, a plurality of side plates, and a plurality of partition walls configured to form the receiving portions,
wherein each of the partition walls comprises a lower partition wall extending from the lower plate by a predetermined height and an upper partition wall extending from the lower partition wall by a predetermined height to a top end of each respective one of the partition walls,
wherein the lower partition walls and the upper partition walls are made of different materials,
wherein each of the lower plate, the side plate, and the lower partition walls of the module case include a thermoplastic resin, and
wherein the upper partition walls include a thermosetting resin.

2. The method according to claim 1, wherein the thermoplastic resin includes a modified polyphenylene ether (mPPE) or a polycarbonate (PC), and
wherein the thermosetting resin is at least one of silicon, epoxy, and polyurethane.

3. The method according to claim 1, wherein the upper partition wall further comprises glass bubbles.

4. The method according to claim 1, wherein the module case is formed by injection molding.

5. The method according to claim 1, further comprising injecting an adhesive member into the receiving portions after preparing the module case and before disposing the respective battery cell in each of the receiving portions.

6. The method according to claim 5, wherein the adhesive member includes a second thermosetting resin.

7. The method according to claim 1, wherein each battery cell is cylindrical or prismatic.

8. A battery pack having received therein a battery module manufactured by the method according to claim 1.

9. A device comprising the battery pack according to claim 8.

10. The method according to claim 1, wherein the preparing the module case of one body includes injection molding, and
wherein the lower partition walls and the upper partition walls include integrated different materials.

11. The method according to claim 10, further comprising injecting a thermosetting resin adhesive into the receiving portions of the module case after preparing the module case and before disposing the respective battery cell in each of the receiving portions,
wherein heating the module case includes heating the thermosetting resin injected into the receiving portions of the module case to fix the battery cells.

* * * * *